United States Patent

[11] 3,616,173

[72] Inventors George W. Green
  Portland, Oreg.;
  Donald G. Sundberg, Newark, Ohio
[21] Appl. No. 664,021
[22] Filed Aug. 29, 1967
[45] Patented Oct. 26, 1971
[73] Assignee Georgia-Pacific Corporation
  Portland, Oreg.

[54] FIRE RESISTANT WALLBOARD
  27 Claims, 4 Drawing Figs.

[52] U.S. Cl.................................................. 161/162,
  106/109, 106/110, 156/39, 156/42, 161/165,
  161/169, 161/193, 161/206, 161/403
[51] Int. Cl........................................................B32b 13/02,
  C04b 11/00
[50] Field of Search........................................... 161/43,
  403, 162, 165, 169, 193, 205, 158; 106/206, 109,
  110; 156/39, 42

[56] References Cited
  UNITED STATES PATENTS

| | | | |
|---|---|---|---|
| 734,679 | 7/1903 | De Monco................ | 106/110 |
| 816,532 | 3/1906 | Covington................. | 106/110 |
| 3,042,537 | 7/1962 | Newell et al.............. | 106/110 |
| 3,069,278 | 12/1962 | Kimpel..................... | 106/110 |
| 3,305,387 | 2/1967 | Fraser et al............... | 106/110 X |
| 3,376,147 | 4/1968 | Dean........................ | 106/110 X |
| 3,454,456 | 7/1969 | Willey...................... | 106/110 X |

Primary Examiner—John T. Goolkasian
Assistant Examiner—D. J. Fritsch
Attorney—Synnestvedt & Lechner ABSTRACT: Fire resistant wallboard having a gypsum core of improved fire resistant properties in combination with relatively low density properties is described. Core compositions having such properties are described as comprising gypsum, glass fibers and either clay, colloidal silica, or colloidal alumina or mixtures thereof. To such core compositions there can also be added unexpanded vermiculite for the purpose of further improving the fire resistant properties of the core.

INVENTORS
GEORGE W. GREEN
DONALD G. SUNDBERG

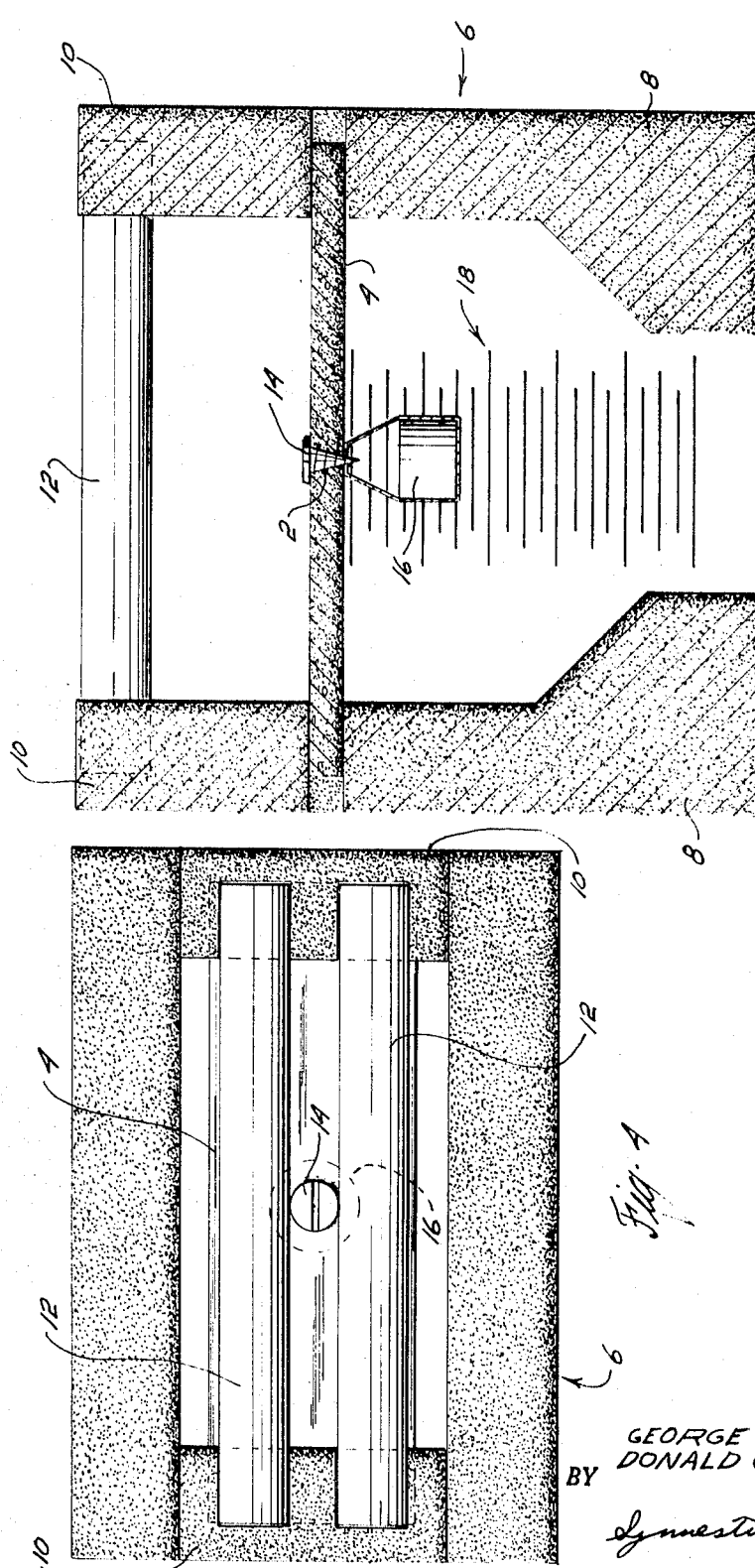

FIRE RESISTANT WALLBOARD

This invention relates to improved fire resistant wallboard and more particularly to gypsum core wallboard having improved fire resistant properties and a relatively low density.

To briefly summarize one of the most important aspects of this invention, it is first pointed out that, in recent years, there have been a number of developments in the wallboard art resulting in improvements in the fire resistant properties of wallboard, but that these developments were not directed to, nor did they permit the manufacture of, a significantly lighter weight or lower density board. Indeed, in some of the most recent efforts to increase fire resistance, the weight or density of the board was even increased.

In contrast to the foregoing, the present invention provides an unusual combination of properties in wallboard, namely a substantial increase in fire resistant properties while at the same time a significant decrease in the weight or density of the board. Numerous advantages are realized by the provision of such wallboard as is fully explained below.

The invention is described in accordance with the following outline:

I. Background
II. Objects
III. Description of Invention
IV. Core Composition
  A. Gypsum
  B. Glass Fibers
  C. Vermiculite
  D. Clay
  E. Colloidal silica
  F. Colloidal alumina
V. Tests
  A. Density
  B. Shrink Resistance
  C. Restrained sag
VI. Examples
VII. Summary

BACKGROUND

That fire resistant gypsum core wallboard is an important building commodity is evidenced by the hundreds of millions of square feet that are sold yearly in the United States, representing a dollar value amounting to tens of millions of dollars.

That fire resistant gypsum core wallboard is an important factor in saving countless lives and preventing incalculable property losses is evidenced by the standards that have been set by governmental agencies, building code authorities, insurance companies, and builders' and manufacturers' associations for the installation and performance of fire resistant wallboard.

In the interest of public safety, building codes require that fire resistant construction assemblies of which wallboard is often a component part be installed in various parts of buildings and that the wallboard assembly pass standard and industry-wide accepted tests which are an evaluation of the fire resistant properties of the wallboard assembly. Fire insurance rates on buildings are influenced by the fire resistant performance rating of wallboard assemblies installed in the building. Manufacturers of wallboard and builders' associations have an interest in seeing that the public is provided with fire resistant wallboard that at least meets accepted quality standards.

Fire resistant gypsum wallboard, also commonly referred to as dry wall, gypsum board, and plaster board, must have certain basic properties in order to meet accepted standards and pass industry-wide accepted fire resistance assembly tests. When exposed to intense heat, such as that generated by fire in a burning building, the wallboard, which is extensively used for constructing interior walls and ceilings, is expected to stay in place for some length of time and serve as an insulation barrier to deter the spread of the fire. When subjected to standard fire resistance tests which simulate conditions in a burning building, it is not unusual for commercially available fire resistant wallboard to remain in place for 1 to 2 hours during which time it is exposed to temperatures as high as 1,850° F. In order to perform in this manner, the wallboard core should resist to some degree its tendency to shrink under the influence of heat because as it shrinks, it progressively pulls away from the supports to which it is fastened and eventually collapses. This allows the fire to spread and attack adjacent parts of the building. In addition, the core should not tend to crack or spall as it is heated and should also exhibit good strength properties at high temperatures. To summarize, fire resistant wallboard should have good dimensional stability properties and strength at high temperatures.

In order to be commercially acceptable, fire resistant wallboard, in addition to having the above-mentioned properties, must also have other satisfactory properties that are related to the manufacture, installation and service of the wallboard. For example, the aqueous slurry which contains the components comprising the core of the wallboard must be capable of being readily mixed and worked into a mass that can be continuously poured and formed into the set core. The core composition must be such that it forms a satisfactory bond with the paper facing that covers the core. The finished product must have good flexibility, strength, nailability, shock resistance, etc.

Another important characteristic that commercially acceptable wallboard must have is that the properties enumerated above must be prevalent in a wallboard that is of a commercially acceptable thickness. This thickness generally ranges from about one-quarter inch to about 1 inch with the most popular thicknesses being about one-half inch and five-eighths inch. Whereas one or more of the above-mentioned properties of the wallboard, particularly the fire resistant properties, may be improved by increasing the thickness of the core, such improvements are obtained at the expense of reducing or even losing other desirable properties. The commercially acceptable thickness range set forth above has been established after years of experience as the most desirable for gypsum core wallboard.

Over the past years there has been a series of important developments which have resulted in improvements in the fire resistant properties of wallboard core. However, as will be seen from the discussion below, little or no progress has been made heretofore with respect to providing a lightweight fire resistant core. It is manifest that the provision of a lightweight fire resistant gypsum core would offer untold advantages in storage, transportation and installation of the wallboard, particularly if such core could be manufactured in accordance with known procedures on available equipment and have all of the properties such as flexiblXility, nailability, etc. that is expected of wallboard. As an illustration of the advantages obtained by being able to reduce the density of wallboard core by even a small percent and at the same time maintaining its fire resistant properties, it is noted that the core of one type of one-half inch thickness wallboard presently on the market weighs about 2,000 lbs. per thousand square feet, whereas a similar board if its core density were reduced by as little as 3 lbs. per cubic foot would weight about 1,890 lbs. per thousand square feet. When it is considered that it is not unusual to ship wallboard in quantities ranging from 10 –20 tons per truck or railroad car load, the seemingly small reduction in density becomes quite significant. Thus with regard to the above comparison, the 3 lbs. per cubic foot reduction in density would enable the manufacturer or distributor to ship close to 1,200 square feet more of board in a 20-ton load.

Another important advantage that would result from the provision of lightweight fire resistant wallboard would be a reduction in the manpower cost of handling and installing quantities of board. Standard size sheets of lower weight fire resistant board could be lifted and installed with less difficulty by workmen who would expend less energy per sheet of board.

Generally speaking, the present industry-wide practice for controlling the density of the gypsum core is by adding and mixing foam into and with the aqueous gypsum slurry from which the core is made. The foam introduces into the core voids which reduce the core's weight. However, there is a limiting amount of foam which can be introduced into the core, because if excess amounts are used, there will not be obtained wallboard of acceptable quality. Experience, heretofore, in the art of manufacturing fire resistant wallboard has shown that a core density of approximately 48 to 52 lbs. per cubic foot is a practical minimum density in that acceptable fire resistant properties are not maintained if the density of the core is lower.

As mentioned above, there have been a number of developments which have improved the fire resistant properties of wallboard core, but none of practical significance for permitting reduction in core density. One of these developments is the subject of U. S. Pat. No. 2,526,066 to Croce wherein it is disclosed that the addition of unexpanded vermiculite and noncombustible fibers, such as asbestos, to a gypsum core improves the fire resistant properties of the core. The unexpanded vermiculite expands when the core is heated and this expansion functions to offset the shrinkage of the gypsum component. This shrinkage is caused by the chemically combined water present in the gypsum being driven off by the heat. This calcination effect also tends to degrade the cohesiveness of the gypsum and thereby reduces the strength of the core. The asbestos fibers impart a mechanical binding or matting effect to the core and thereby prevent or reduce the tendency of the expanding vermiculite to cause flaking or spalling of the otherwise weakened core. To maintain acceptable fire resistance ratings, this type of core was generally made with a density of no lower than about 50 lbs. per cubic foot.

Another development is reported in U. S. Pat. No. 2,681,863 to Croce and Shuttleworth wherein it is disclosed that the addition of drawn textile glass fibers to a gypsum core imparts many desirable properties, including fire resistant properties, to the core. The drawn textile glass fibers are added as short strands of fibers, loosely bonded by a water soluble binder, to the aqueous slurry composition from which the core is formed and in which they readily and completely disperse upon dissolution of the binder. The dispersibility characteristic of the fibers allows a core to be made in which the fibers are individually and uniformly distributed throughout the core, thereby imparting to the core the desirable properties of the fibers, such as strength and fire resistance. To maintain acceptable fire resistance ratings, this type of core was generally made with a density of no lower than about 50 lbs. per cubic foot.

Still another development is disclosed in U.S. Pat. No. 2,744,022 to Croce and Shuttleworth. This patent discloses wallboard having a core comprising gypsum, unexpanded vermiculite and drawn textile glass fibers. It is reported in this patent that the glass fibers tend to maintain their strength as the board is subjected to heat and thus function to hold the core together more effectively than other types of fibers previously used. This combination of unexpanded vermiculite and glass fibers provided a gypsum core of improved overall strength and one which had less of a tendency to shrink, spall and flake when subjected to heat. The density of this type of core was generally maintained at not much lower than about 50 lbs. per cubic foot in order for the core to have acceptable fire resistance ratings.

The developments described above have been extremely important as evidenced by the commercially successful products that have resulted therefrom. However, as is apparent from the disclosure of the above-mentioned patents and the above discussion of the patents, the developments were not directed to, and in fact did not result in any significant decrease in the density of the wallboard core. That the trend in the fire resistant wallboard art has not been directed to the provision of lightweight or relatively low density products is further evidenced by the disclosure of the patent discussed immediately below.

U.S. Pat. No. 2,853,394 to Riddell and Kirk is related to a somewhat different type of fire resistant wallboard than those described in the previously discussed patents. This patent discloses wallboard comprising gypsum, expanded perlite and vitreous ceramic fibers, such as glass fibers. The wallboard is described as being dense and of high weight, for example 2,800 to 3,000 lbs. per thousand square feet of five-eighths inch board. This corresponds to a core density ranging from about 58 to about 62 lbs. per cubic foot. The patent emphasizes that the board must be dense, of high weight and substantially free of foamed cells or artificially produced voids which if present have a tendency to reduce the fire resistant properties of the wallboard. It would thus appear that any improved fire resistant properties are attained at the expense of increasing the weight of the board.

Whereas some developments have been reported in the provision of lightweight gypsum board by the incorporation of boric acid or guar gum into the core composition, these developments were made in connection with board that is not generally classified as fire resistant board. It is noted that large quantities of gypsum wallboard which do not have the fire resistant properties of fire resistant board can be utilized in applications where the spread of fire would occur readily even if fire resistant board were used. Examples of these applications are the use of wallboard for interior walls which have openings, such as archways, doorways, etc.

OBJECTS

It is an object of this invention to provide an improved fire resistant wallboard.

It is another object of this invention to provide an improved wallboard characterized by the gypsum core of the wallboard having a relatively low density and improved fire resistant properties.

It is a further object of this invention to provide a lightweight, fire resistant, gypsum core wallboard having a reduced tendency to shrink and lose its strength when subjected to high temperatures.

It is still another object of this invention to provide fire resistant gypsum core wallboard of conventional thickness, but which is lighter in weight and which has improved fire resistant properties in that it has a reduced tendency to shrink and lose its strength when subjected to high temperatures.

How the above objects and others are obtained will become apparent from the following detailed description of this invention and accompanying drawings wherein:

FIG. 3 is a sectional view through an oven and shows a test setup for evaluating fire resistant properties of wallboard core; and FIG. 4 is a plan view of the test setup shown in FIG. 3.

DESCRIPTION OF INVENTION

Figure 1:
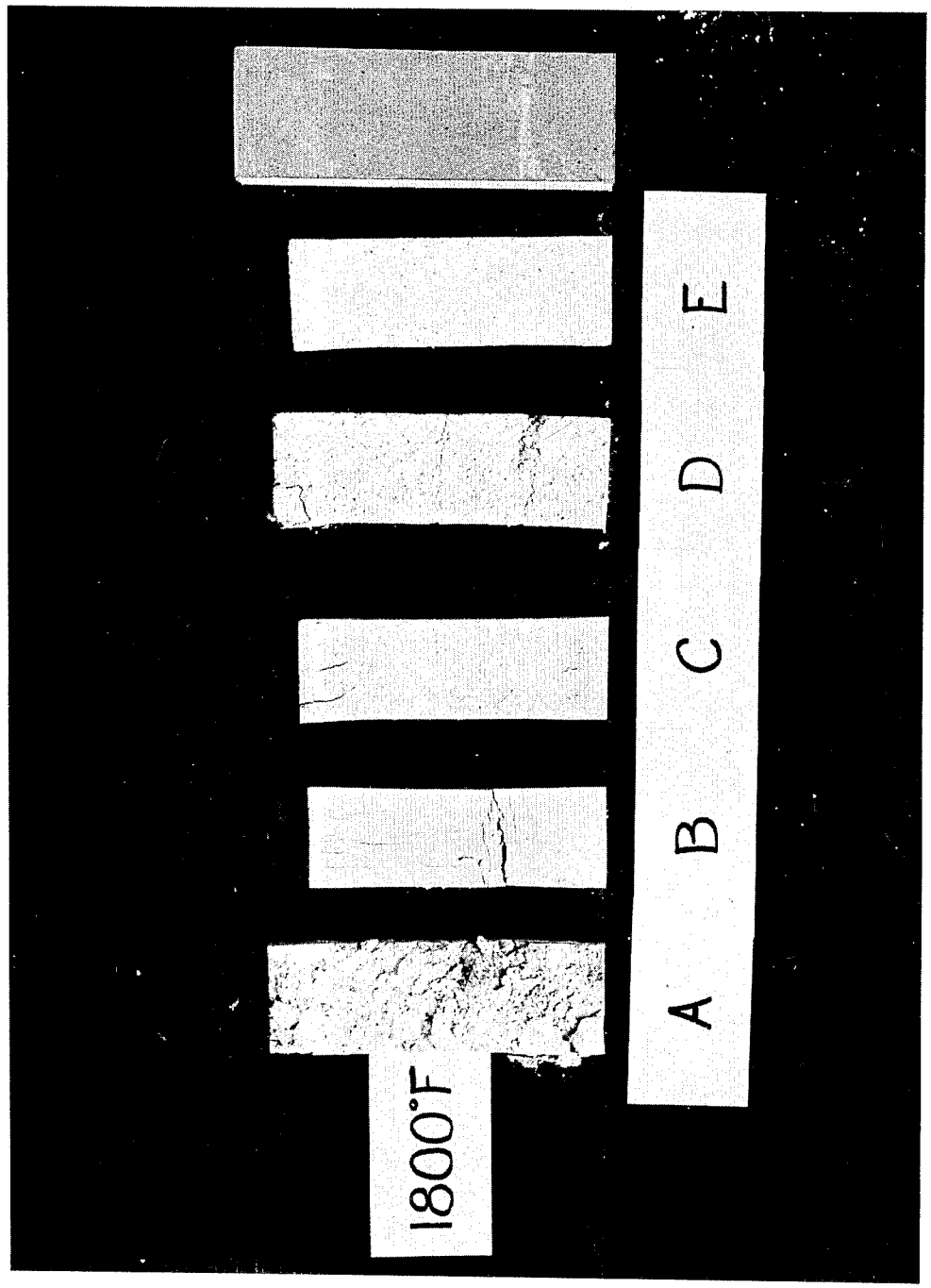
FIG. 1 shows the effects of heat on a wallboard core sample of this invention and on core samples heretofore available.

In accordance with this invention, there is provided gypsum wallboard core X formulated from ingredients described hereinafter, having a density of at least about 35 lbs. per cubic foot and preferably from about 40 to about 50 lbs. per cubic foot, and having fire resistant properties such that when the core is one-half inch thick, it has a shrink resistance ranging from about 60 to about 85, and a temperature failure value ranging from about 1,200° F. to about 12,000° F. The meanings of and methods for determining the density, shrink resistance, and temperature failure values are set forth in detail hereinbelow. Suffice it to say at this point that the above values are related to the fire resistant properties of the core and that: the density of the core is measured by a conventional test method; the shrink resistance is a measure of the proportion of surface area of a segment of core which remains after the core has been heated to a defined temperature over a defined period of time; and the temperature failure value is the temperature at which a segment of core under a defined load fails or collapses as the core is heated.

Wallboard core within the scope of this invention is characterized by having, at high temperatures, strength, dimensional stability and integrity properties heretofore unavailable for the density of the core. The shrink resistance and temperature failure values referred to above are indicative of, and are a measure of, the extent to which wallboard core exhibits such properties when subjected to heat.

A combination of ingredients that has been found to be capable of being processed into gypsum wallboard core having a density in the range described above and one having shrink resistance and temperature failure values in the range described above is gypsum, glass fibers, and a small particle size inorganic material of either clay, colloidal silica (silicon dioxide), or colloidal alumina (aluminum oxide) or combinations of any of said inorganic materials. An additional ingredient that is preferably added to the above combination of ingredients to further improve the overall fire resistant properties of the wallboard core is unexpanded vermiculite.

The ingredients mentioned above can be processed and formed according to known techniques, described more fully below, into the improved fire resistant wallboard of this invention. Generally speaking, this involves forming the core from an aqueous slurry containing the ingredients.

Set forth immediately below are amounts of ingredients capable of being processed and formed into improved fire resistant wallboard core of this invention. The amount of each of the ingredients is given as "weight percent" which means weight percent based on the total weight of the dry ingredients, that is on the total weight of the ingredients before they are combined with water to make the aqueous slurry from which the core is formed.

| Ingredient | Broad Range, Weight Percent | Preferred Range, Weight Percent |
| --- | --- | --- |
| Calcium sulfate | about 71.5 to about 99.0 | about 91.0 to about 97.0 |
| Glass Fibers | about 0.1 to about 1.0 | about 0.2 to about 0.5 |
| Vermiculite | 0 to about 7.5 | about 1.0 to about 3.5 |
| Small particle size inorganic material including clay, colloidal silica or colloidal alumina | about 0.5 to about 20.0 | about 2.0 to about 5.0 |

In addition to the above ingredients, other additives which are generally added in small amounts to gypsum core formulations to impart desirable properties to the Xwallboard and facilitate manufacturing can be utilized in this invention. Such additives include materials such as, for example, foaming agents, accelerating agents, dispersing agents, core adhesives, etc.

This invention thus provides a combination of ingredients which can be formulated in amounts as set forth above and formed into improved fire resistant wallboard, the core of such board being characterized by having the following properties when the thickness of the core is one-half inch:

| | |
| --- | --- |
| density | at least about 35 lbs. per cubic foot and preferably from about 40 to about 50 lbs. per cubic foot |
| shrink resistance | about 60 to about 85 |
| temperature failure value | about 1200° F. to about 2,000° F. |

It should be realized that whereas the core compositions of this invention can be made into densities heretofore known for wallboard cores, the fire resistant properties of the cores of this invention will be for the same density significantly better. In other words, and with reference to control of the core density by introducing voids into the core, as by adding and mixing foam into and with the aqueous slurry from which the core is formed, the invention allows a greater volume of voids to be introduced into the core, as by the addition of more foam, with the result that a lower density core can be made without sacrifice of fire resistant properties.

It should also be understood that included within the scope of this invention is wallboard which has a core thickness less than or greater than one-half inch, so long as its density falls within the above range, so long as the core is made from the ingredients set forth above, within the ranges set forth above, and so long as the particular core formulation involved, when made into a test core of one-half inch thickness and the same density yields a test core with shrink resistance and temperature failure values within the above ranges. It will be appreciated that a core having a thickness less than one-half inch generally will not have as good fire resistant properties as a ½-inch core even if the densities of the cores and the ingredients, and the amounts thereof, from which the cores are formed are the same. On the other hand, a core having a thickness greater than one-half inch will generally have better fire resistant properties than a ½-inch core, even though the core densities and the ingredients, and amounts thereof, from which the cores are formed are the same.

Figure 2:
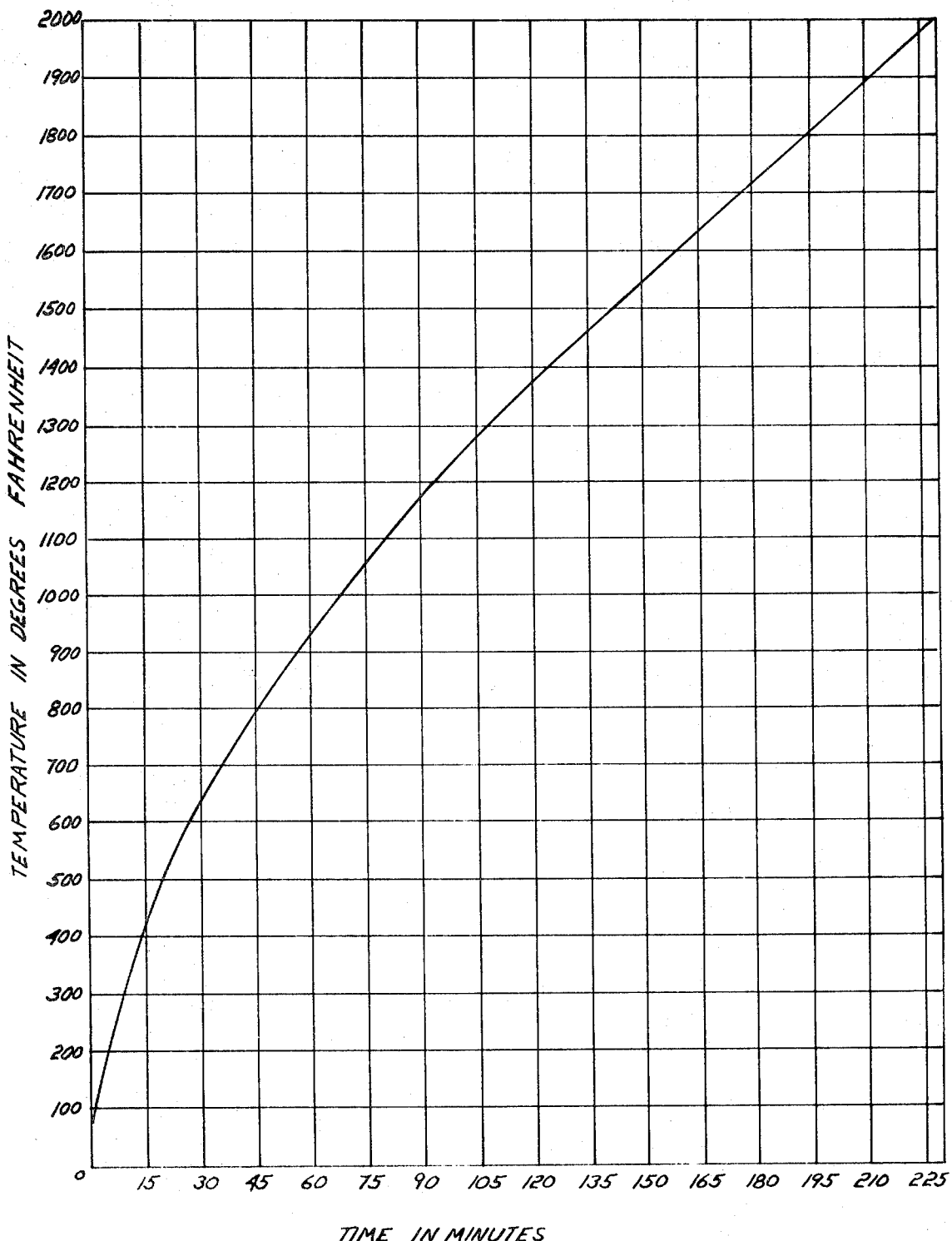
FIG. 2 is a temperature-time chart utilized in a test to evaluate the fire resistant properties of wallboard core.

FIG. 1 is illustrative of the striking improvements in the fire resistant properties of wallboard core that are provided by this invention. Core Samples A through D were taken from fire resistant wallboard sold on the market and Sample E is a core made in accordance with this invention. The unlettered sample appearing on the far right is representative of the original size of Samples A through E before they were subjected to heat in the manner set forth below. Each sample was placed flat on the floor of a muffle furnace. The temperature of the furnace was raised approximately as shown in the temperature-time chart of FIG. 2 until a temperature of 1,800° F. was reached. The temperature of the furnace was maintained at 1,800° F. for 1 hour. The door of the furnace was then opened and the samples were allowed to cool to ambient temperature.

It can readily be seen that Sample E maintained its dimensional stability and integrity to a much greater extent than Samples A through D despite Sample E having a density of about 41 lbs. per cubic foot, whereas the lowest density of any one of the other samples was about 48.5 lbs. per cubic foot and one of the samples had a density as high as 54 lbs. per cubic foot.

With reference to the core samples shown in FIG. 1, and keeping in mind that the fire resistant performance will be better for those cores which shrink, spall, crack and crumble the least, it is noted that although Sample A did not shrink to any great extent, it did spall and crack extensively so that it was very crumbly and thus extremely weak. Sample B shrank more than any of the other samples, and in addition had deep fissures and cracks. Sample C shrank somewhat less than Sample B and also had a few deep fissures. Sample D had a few very deep cracks and numerous surface cracks. However, Sample E, the sample made in accordance with this invention, exhibited the best overall dimensional stability and integrity in that it had no deep cracks, relatively few surface cracks and it shrank to a lesser extent than some of the other samples, even though it had a density significantly lower than any of the other samples.

To further illustrate the advantages provided by this invention, it is pointed out that 10 tons of five-eighths inch nominal thickness wallboard presently sold in large quantities would comprise about 7,800 square feet of wallboard, whereas 10 tons of the same thickness wallboard having a core within the scope of this invention would comprise about 9,200 square feet of wallboard. This constitutes an increase of about 18 percent, that is a manufacturer or distributor could ship or store about 18 percent more wallboard in a 10-ton load. With respect to the above comparison, it should be understood that the wallboard made in accordance with this invention would have the same or better fire resistant properties than presently available wallboard, and in addition, would also have all of the other properties, for example, nailability, flexibility, etc. required of wallboard. It will be appreciated from the above figures that very substantial savings can be realized in transportation and storage costs, while at the same time the high standards set by the various governmental agencies, building code authorities, insurance companies, and manufacturers' and builders' associations for fire resistant performance are maintained or even exceeded.

It should also be appreciated from the above figures that the invention provides wallboard which can be handled with less difficulty by workmen who should be able to install greater quantities of board over a period of time.

CORE COMPOSITION

GYPSUM

The major ingredient of the core composition of the invention is set gypsum, that is, calcium sulfate dihydrate. The set gypsum is formed by the crystallization or hydration of calcium sulfate hemihydrate or calcined gypsum which along with the other ingredients comprising the core is slurried with water according to the usual techniques. Thus, the core comprises the set product of calcium sulfate hemihydrate or calcined gypsum and the other ingredients comprising the core. When "calcium sulfate" is used herein and in the claims it includes within its meaning calcium sulfate hemihydrate and calcined gypsum.

The calcium sulfate component utilized should not be so alkaline as to have a degrading effect upon the glass fibers of the core composition. In general, when 100 grams of the various types of calcium sulfate which are available are mixed with an equal amount of water, the pH of the mixture will range from slightly more than 7 to less than about 9.

In general, the set gypsum core should be formed from amounts of calcium sulfate ranging from about 71.5 to about 99.0 weight percent and preferably amounts ranging from about 91.0 to about 97.0 weight percent. If amounts less than about 71.5 weight percent are utilized, there generally will be obtained a core that does not have satisfactory strength and one that does not form a satisfactory bond with the facing paper of the wallboard.

Glass Fibers

The glass fiber component of wallboard core compositions formulated in accordance with this invention is the type of drawn textile glass fibers described in U.S. Pat. Nos. 2,681,863 and 2,744,022 to Croce and Shuttleworth. The manufacturing and functional improvements and advantages obtained by utilizing such glass fibers as a component of a gypsum core as opposed to blown glass fibers or other natural or synthetic fibers are described in the aforesaid patents, the disclosures of which as they relate to the description of the drawn textile glass fibers are incorporated herein by reference.

In brief and as described in said patents, the drawn textile glass fibers are produced as continuous individual filaments having a diameter, for example, of from about 0.0002 to about 0.0005 inch by discharging molten material from which the fibers are made through orifices and attenuating the discharged filaments as by winding on a high speed winding drum. During the manufacturing process it is necessary to group the individual fine filaments into strands, each of which contains, for example, from 100 to several hundred individual filaments in order to prevent the filaments from breaking during the high speed manufacturing process. Another step in the manufacturing process of the fibers is the application of a protective coating to the individual filaments to prevent abrading action between several grouped filaments of each strand and between the strands that form the roving. Whereas the coating may be of the type that produces a strong permanentlike bond, the glass fiber strands for use in this invention are those which have been loosely bonded together by the use of a relatively weak bondingtype material, such as for example, starch or other water softenable or soluble coating material.

Prior to combining the loosely bonded textile glass fibers with the other components which comprise the core composition, they are cut into short lengths, such as for example one-eighth inch to 1 inch, in order to provide short sections or bundles of fibers. Upon adding the short sections or bundles of fibers to the aqueous slurry composition from which the core of the wallboard is formed, the bonding or coating material softens or dissolves. As the slurry is mixed, the glass fibers which comprised the bundle are separated into individual filaments which are completely dispersed in the slurry. After the core forming step there is obtained a core having short substantially straight, resilient, flexible individual textile glass filaments distributed uniformly therethrough. The thorough dispersion and random relationship of the direction of the individual fibers in the core imparts strength and other desirable properties to the wallboard.

In general, the core should be made from amounts of glass fibers ranging from about 0.1 weight percent to about 1.0 weight percent, and preferably from amounts ranging from about 0.2 X weight percent to about 0.5 weight percent. If amounts less than about 0.1 weight percent are utilized, the core has a tendency to crack and break apart readily when exposed to severe heat. It is quite difficult to incorporate into the core an amount of glass fibers exceeding about 1.0 weight percent. Such amounts have a tendency to mat together into lumps or bundles rather than dispersing uniformly.

Vermiculite

The vermiculite component that can be utilized in the core compositions of this invention is comminuted, unexpanded vermiculite. The functional improvements and advantages obtained by incorporating vermiculite into a wallboard core composition are set forth in U.S. Pat. No. 2,526,066 to Croce and U.S. Pat. No. 2,744,022 to Croce and Shuttleworth. As noted in these patents, unexpanded vermiculite upon heating expands in a manner such that it tends to compensate for the inherent shrinkage of the gypsum component of the core composition as the chemically combined water in the gypsum is driven off by heat. Ideally, the quality, quantity and particle size of the vermiculite present in the composition should be such that when it expands it will substantially equal the shrinkage of the set gypsum component as it is heated and as its combined water is driven off.

It is noted in the aforesaid patents that the amount of vermiculite incorporated into the gypsum core composition is advantageously defined in a functional manner because the properties of vermiculite tend to vary, depending on its particle size and the source of the vermiculite, i.e., the geographical area in which it is mined. For example, vermiculite from different sources tends to expand in different amounts and regardless of source, the effective expansion of vermiculite varies with the degree of comminution of the mineral. In this connection, vermiculite from the mines of Libby, Montana, is known to have as good expansion properties as vermiculite from other known sources and the vermiculite from this particular source is therefore designated in said patents and herein as being "high grade".

In accordance with this invention it has been found that such high grade vermiculite which is of −28 U.S. Standard Mesh commercial grading will add to the fire resistant properties of wallboard when utilized in amounts ranging up to about 7.5 weight percent, and preferably in amounts ranging between about 1.0 to about 3.5 weight percent.

When vermiculite other than high grade vermiculite is used or when high grade vermiculite having a particle size different from −28 mesh is used, it should be of such particle size and be utilized in amounts such that when the wallboard core is heated to the calcining temperature of the gypsum, the vermiculite will have substantially the same total amount of expansion as would high grade vermiculite of −28 mesh commercial grade when utilized in amounts ranging up to 7.5 weight percent. This approach to defining the amount of vermiculite required when the vermiculite used is of a grade other than high grade and of a particle size different from −28 mesh is the same as that used in the above-mentioned 2,526,066 and 2,744,022 patents.

Improved fire resistant wallboard is obtained when the core composition comprises gypsum, glass fibers and small particle size inorganic material of either clay, silica or alumina. However, when the core is exposed to heat, noticeably less early shrinkage of the core is experienced when vermiculite is also included as a component of the core. If, however, the amount of high grade −28 mesh vermiculite exceeds about 7.5 weight percent the core has a tendency to expand to such an extent that it cracks, spalls, and becomes weak. Good overall performance and fire resistant properties are obtained when there is utilized vermiculite in amounts ranging from about 1.0 percent to about 3.5 percent.

Clay

The small particle size inorganic materials that have been found to be effective in cooperating with the gypsum and glass fiber components or gypsum, glass fiber and vermiculite components to provide a wallboard core having fire resistant properties heretofore unattainable are clay, colloidal silica and colloidal alumina. Mixtures of two or more of these materials can also be utilized.

The numerous varieties of clays that have been tested have all been found to be effective in cooperating with the other composition components described herein above to impart improved fire resistant properties to the gypsum core, although as will be explained more fully below, the use of some clays is preferred over others because they are more readily dispersible in the aqueous slurry from which the core is formed. Still other clays have high water absorbance and are thus not particularly satisfactory because excess water must be subsequently driven off during the drying of the core and this increases production costs.

Broadly speaking, clays are natural, earthy, fine-grained materials, most of which exhibit plastic characteristics when moistened with limited amounts of water. In general, clays comprise primarily alumina, silica and water and may also contain to a lesser extent iron, alkali, alkaline earth and other metals. The various types of clays in general have particle sizes ranging from fractions of a micron to about 40 microns, although some materials with an even larger particle size are also considered clays. It should be understood that materials which do not have all of the above characteristics, but which nevertheless are generally referred to as clays because they have one or more of the above characteristics, are included within the term "clay" as used herein.

Examples of the types of clay that can be utilized are: bentonite—comprised mainly of the clay mineral montmorillonite; attapulgite—clays which contain magnesium aluminum silicates; and kaolinitic clays—including for example, kaolin (also referred to as china or paper clays), ball clay, fireclay, and flint clay—which clays are comprised predominately of the clay mineral kaolinite. Other of the various types of clays which contain mixtures of various proportions of clay minerals, such as for example illite, chlorite, kaolinite and montmorillonite, as well as nonclay materials, may also be used.

As illustrative of the components of which clays are comprised it is noted that the following formulas are generally given for the clay minerals listed below:

Kaolinite $Al_2O_3 \cdot 2 SiO_2 \cdot 2 H_2O$
Montmorillonite $(Mg, Ca)O \cdot Al_2O_3 \cdot 4 SiO_2 \cdot n-H_2O$
Attapulgite $3 MgO \cdot 1.5 Al_2O_3 \cdot 8 SiO_2 \cdot 9 H_2O$ To further illustrate the materials which are present in clay products, there is set forth below typical chemical analyses that have been reported for two commercially available clays:

| ASP Clay Products | | Attapulgus Clay Products | |
|---|---|---|---|
| Silicon ($SiO_2$) | 45.4% | Silicon ($SiO_2$) | 68.0% |
| Aluminum ($Al_2O_3$) | 38.8% | Aluminum ($Al_2O_3$) | 12.0% |
| Iron ($Fe_2O_3$) | 0.3% | Magnesium (MgO) | 10.5% |
| Titanium ($TiO_2$) | 1.5% | Iron ($Fe_2O_3$) | 5.0% |
| Calcium (CaO) | 0.1% | Calcium (CaO) | 1.7% |
| Sodium ($Na_2O$) | 0.1% | Phosphorus ($P_2O_5$) | 1.0% |
| Potassium ($K_2O$) | Trace | Potassium ($K_2O$) | 1.0% |
| Loss on Ignition | 13.8% | Titanium ($TiO_2$) | 0.7% |
| | | Trace Elements | 0.1% |

The ASP clay products are kaolinitic-type clays sold by Minerals & Chemicals Division of Minerals & Chemicals Philipp Corporation. The attapulgus Clay products are attapulgite-type clays sold by Minerals & Chemicals Division of Minerals & Chemicals Philipp Corporation.

The above analyses give the weight percent on a moisture-free or volatile-free basis; it is noted that the major constituents shown in the analyses do not exist as free oxides but are present as complex aluminum silicate or complex magnesium aluminum silicate.

Colloidal Silica

The colloidal silica component, a well-known material, is a synthetic material that can be made by various processes, including for example, those involving flame hydrolysis of silicon tetrachloride. The particle size and other characteristics of the colloidal silica are generally determined by the specific process which is utilized to make the silica. In general, colloidal silicas can be made in particle sizes ranging from thousandths of a micron, for example, about 0.005 micron to as high as about 10 microns. Although the larger size particles may not be considered to be truly colloidal materials, they are effectively used in the practice of this invention and are included within the meaning of "colloidal silica" as used herein.

Colloidal silica materials which are available can have an $SiO_2$ content as high as about 99.8 weight percent with the remainder of the material comprising extremely small amounts of other ingredients, including other metal oxides. On the other hand, there are also available colloidal silica materials which contain varying amounts of aluminum oxide within the particle and these materials are also included within the scope of this invention.

Colloidal silicas are available from the following companies which market them under the trademarks set forth: Degussa Co., Inc., Pigments Division—Aerosil; E.I. DuPont de Nemours & Co.—Ludox; W.R. Grace and Co., Davison Division—Syloid; and Godfrey L. Cabot, Inc.—CAB-O-SIL.

Colloidal Alumina

The colloidal alumina component is also a well-known material. It is a powdery material which is capable of being dispersed in water to form a stable, positively charged, colloidal sol. In general, the colloidal alumina particle is a fibrillar crystal which is about 0.1 micron long and 0.005 micron in diameter. A source of this material is the E. I. Dupont de Nemours & Co. which markets the colloidal alumina under the trademark Baymal.

The small particle size inorganic materials should be utilized in amounts ranging from about 0.5 to about 20.0 weight percent and preferably from about 2.0 to about 5.0 weight percent. Amounts less than about 0.5 weight percent of the clay, silica or alumina have little effect on the fire resistant properties of the core and if amounts greater than about 20 weight percent of these materials are used, the core has a tendency to be weak and to not form a satisfactory bond with the paper facings covering the core.

It has been found that when the clay, silica or alumina is utilized in amounts ranging from about 2.0 to about 5.0 weight percent, a core can be made that has a good combination of fire resistant properties along with all of the other properties required for a commercially acceptable product, including, for example, good flexibility, strength, nailability, shock resistance and the ability to form good bonds with the paper facings.

Whereas all types of clays, colloidal silica and colloidal alumina are effective in improving the fire resistant properties of the core, the extent to which these properties are modified differs depending on the particular material used. In general, it has been found that calcined kaolin clays, that is kaolin clays which have had their chemically combined water removed by heating, are somewhat more effective in improving the fire resistant properties than other clays. Bentonite clays have been found to improve the fire resistant properties of the core to a lesser extent than the calcined kaolin clays, while wallboard cores containing kaolin clays which have not been calcined have been found to have fire resistant performance characteristics falling between core compositions containing calcined kaolin and bentonite. In general, it is preferred to utilize clays as the small particle size inorganic materials rather than the colloidal silica or colloidal alumina because the clays, for the same amounts, impart better fire resistant properties to the core. In addition, the clays generally are less costly.

From the standpoint of manufacturing the core, certain clays are preferred because they are more readily dispersible in the aqueous slurry from which the core is formed and they are less water absorbent than other clays. In this respect kaolin and calcined kaolin clays have been found to be very satisfactory. Clays which have been found to be more difficult to disperse, i.e., they are dispersible only after vigorous mixing, and which are highly water absorbent, are the bentonite clays.

With respect to the dispersibility of the colloidal silica and colloidal alumina, they are somewhat difficult to disperse. However, some of these materials are also available in dispersed form and when in such form, there is no problem dispersing them in the aqueous slurry. A disadvantage of utilizing the dispersed form of these materials is that they are more costly than the dry powder form.

It is indeed surprising that the presence of clay, colloidal silica or colloidal alumina in gypsum core compositions results in a core having improved fire resistant properties in combination with the density properties obtained because these small particle size inorganic materials have specific gravities which are generally higher than the calcium sulfate dihydrate which is the major ingredient present in the core. The specific gravity of calcium sulfate dihydrate is about 2.32, whereas the following commercially available clays have the specific gravities stated: kaolin clays—2.58; calcined kaolin clays—2.63; and attapulgite clays—2.36 and ranging up to about 2.47 Other clays, such as for example fireclay, ball clays and bentonite clays, have specific gravities ranging from about 2.2 to about 2.6, and the specific gravities of some commercially available colloidal silica and alumina particles are reported as 2.65 and 3.5 to 4.0 respectively. Thus, although an inherently heavier material is added to the core, its presence therein allows a lower density core with equal or better fire resistant properties to be manufactured.

The components comprising the core composition can be mixed according to known methods and the core formed according to known techniques. In general, the core is made by metering the dry ingredients and water into a mixer. The density of the resulting core can be controlled by adding foam to the water and other ingredients in the mixer. The foam can consist of a dilute solution of surface active foaming material such as ammonium lauryl sulfonate. The dilute solution can be foamed by air pressure. The quantity of foam added to the mixer containing the water and core ingredients determines the amount of voids or cells present in the resulting core. In essence, the foam displaces the other core ingredients to form cells or voids. After the foam, water and other ingredients are thoroughly mixed, there is obtained a pourable aqueous slurry. The slurry is dispensed through one or more outlets at the bottom of the mixer onto a moving paper cover sheet. Another paper cover sheet is then placed on top of the slurry so that the slurry is then sandwiched between two moving paper cover sheets which are the paper facings of the resultant wallboard. The thickness of the resultant board is controlled by a forming roll and the edges of the board are formed by appropriate mechanical devices which continuously score, fold and glue the overlapping edges of the paper. Additional guides are used to maintain thickness and width as the "setting" slurry travels on a moving belt.

It will be appreciated from the above discussion that the improved fire resistant wallboard can be made without having to significantly modify established processes for making wallboard and without requiring any significant capital investment in machinery or other equipment that is used in the manufacture of the board.

TESTS

Density

As stated above, the wallboard included within the scope of this invention comprises a core that has a density of at least about 35 lbs. per cubic foot and preferably ranges from about 40 to about 50 lbs. per cubic foot. Although higher density cores, for example in the range of 65 lbs. per cubic foot, can be made from the ingredients described herein and are included within the scope of this invention, it is not particularly desirable to do so for various reasons. One reason is that as the core density is increased above about 50 lbs. per cubic foot, the incremental increase in fire resistant properties of the board is not justified by the incremental increase in the density. It will also be appreciated that if the board is too dense, standard sheet sizes of the wallboard which are now conveniently handled by workmen would have to be reduced or else the sheet would be too heavy to be conveniently handled. In general, if the density of the core exceeds about 50 lbs. per cubic foot, one or more of the advantages provided by the lightweight fire resistant wallboard described herein are not realized. On the other hand it has been found that as the core density is decreased below about 40 lbs. per cubic foot, problems are encountered in forming good bonds between the core and the facing paper.

The density of the core is determined by weighing a sample of a test core described hereinbelow and dividing its weight by the volume of the core.

Shrink Resistance

The shrink resistance of wallboard core as used herein is a measure of the proportion of the core's area that remains after a core sample has been heated to a defined temperature over a defined period of time. The extent to which a wallboard core tends to shrink when it is subjected to heat is related to the dimensional stability of the core and is an indication of how long the wallboard will remain in place attached to joist supports before it pulls away from the supports because of shrinking and collapses.

More specifically, the test, utilized to determine whether a wallboard core falls within the scope of this invention with respect to shrink resistant properties, includes preparing a core sample having a length of 9 inches, a width of 3 inches and a thickness of 0.5 inch. The sample is conveniently prepared by blending the components comprising the core composition in a dry blender for at least 5 minutes. The blended components are then added slowly to avoid lumping to an amount of water necessary to form a core of the desired density. Water, instead of foam, is used to control the density of the core because when working with such small core samples the density can be better controlled through the use of water. The aqueous slurry which is obtained by blending the components and water is then stirred until it begins to set, at which time the slurry is poured into a mold 3 inches wide and 0.5 inch deep. The length of the mold is arbitrary. The sample is removed from the mold when it is sufficiently hardened and cut into 9.25-inch lengths and then left at room temperature for at least 1 hour to assure complete hydration. The sample is then dried overnight in a constant temperature mechanical convection oven at 110° F. After the sample has dried overnight, it is sanded to 9-inch lengths. The core sample is then positioned in a muffle furnace by placing the sample on its long, ½-inch thickness edge upright on a piece of insulating material. The sample is not restrained. The insulating material should be provided with means for preventing the core sample from toppling over and for this purpose it has been found expedient to drive part way into the insulating material nails against which the sample can lean if it begins to topple.

The oven and sample are at room temperature when the sample is placed therein. The furnace is then turned on and the oven heated to 1,800° F. according to the temperature-time chart shown in FIG. 2. The furnace is maintained at 1,800° F. for 1 hour and then the heat is cut off and the furnace is left to cool with its door open. After the furnace and sample have cooled to ambient temperature the sample is removed. The surface area of one of the 9-inch by 3-inch faces of the cool sample is then measured. The surface area remaining, divided by the original surface area times 100 gives the percent surface area remaining, and this is the value referred to herein and in the claims as the shrink resistance.

Restrained Sag

The temperature failure value as used herein is the temperature at which a defined size core sample subjected to a defined load fails or collapses as the sample is heated. The temperature failure value is related to the dimensional stability of the core and is an indication of the temperature to which it can be heated before it weakens in strength and collapses.

The test utilized to determine the temperature failure value is referred to herein as the restrained sag test and consists of the following procedure. The dimensions of the sample and the preparation of the sample are the same as that described above for the shrink resistance test. In addition, and with reference to FIGS. 3 and 4, a ⅛-inch hole 2 is drilled in the center of the sample 4. The sample is placed in a muffle furnace 6 on spaced fire brick supports 8 with at least 1 inch of each end of its 9-inch by 3-inch face positioned on the spaced supports. Fire brick restrainers 10 are placed on each of the supported ends. Each of the restrainers is notched and two 9-inch sections of 1 inch diameter steel restraining rods 12 are placed in the notches. The restrainers function to prevent failure of the sample by its ends sliding off the supports. Failure of the sample is induced by a 908±1 gram weight 16 which hangs from a wallboard screw 14 which is inserted through the hole 2 in the sample. The weight 16 approximates the weight of wallboard which would be supported by each of the fasteners utilized in conventional installation of the sheet of wallboard on a ceiling. An etched section of fire brick 18 with ¼-inch spacing or other suitable measuring means can be placed behind the sample in order to measure the extent to which the sample sags as it is heated. The temperature of the oven is raised according to the temperature-time chart shown in FIG. 2. As the oven heats up the sample will begin to sag and the sag can be measured periodically until the sample fails, as by breaking or collapsing, or as by the screw pulling through. The temperature of failing is recorded. This temperature is referred to herein as the temperature failure value.

EXAMPLES

In all of the examples which follow, unless otherwise stated, the core sample had a density of about 43 lbs. per cubic foot, and the gypsum, glass fibers and vermiculite components that were used are as follows:

| | |
|---|---|
| Gypsum | CaSO₄·½H₂O |
| Glass fibers | strands of drawn textile glass fibers, the fibers having a diameter of about 0.00025 inch, the strands having a length of about 0.5 inch and loosely bonded together by starch and sold by Owens Corning Fiberglass and designated as 636 Glass Fiber Roving |
| Vermiculite | high grade, comminuted, unexpanded vermiculite having a −28 U.S. Standard Mesh commercial grading |

In the examples and throughout the specification and claims, "weight percent" means weight percent based on the total weight of the dry core ingredients that were utilized to make the core.

The core samples of the examples were prepared and their properties measured according to the description appearing above under the headings, "Density," "Shrink Resistance" and "Restrained Sag."

The experimental results set forth in Table 1 below are illustrative of the improvements obtained in the shrink resistance of cores formulated in accordance with this invention and particularly point out and compare the effectiveness of clay, colloidal silica and colloidal alumina. In addition to the small particle size inorganic material and gypsum, there was also utilized 0.45 weight percent glass fibers to make the core.

TABLE 1

| Ex. No. | Small Particle Size Inorganic Material Type | Amt. wt. % | Gypsum wt. % | Shrink Resis. |
|---|---|---|---|---|
| 1 | — | — | 99.55 | 53.7 |
| 2 | Clay (ASP 102¹) | 5.0 | 94.55 | 80.0 |
| 3 | Silica (Syloid 244²) | 5.0 | 94.55 | 71.9 |
| 4 | Alumina (Baymal³) | 5.0 | 94.55 | 69.6 |
| 5 | Silica (Syloid 244) | 2.5 | 94.55 | 71.9 |
| | Alumina (Baymal) | 2.5 | | |
| 6 | Silica (Syloid 244) | 5.0 | 89.55 | 77.8 |
| | Alumina (Baymal) | 5.0 | | |

From the above table it can be seen that the use of 5 weight percent clay reduced the shrinkage of the core by about 57 percent and the use of 5 weight percent silica and alumina reduced the shrinkage by over 39 percent and over 34 percent respectively.

The experimental results set forth in Table 2 below are illustrative of the wide range of amounts of small particle size inorganic material that can be added to the core compositions of this invention to improve the shrink resistance thereof.

TABLE 2

| Example No.* | Clay (ASP 102) wt. % | Gypsum wt. % | Shrink Resistance |
|---|---|---|---|
| 7 | — | 99.55 | 55.5 |
| 8 | 1.0 | 98.55 | 67.5 |
| 9 | 5.0 | 94.55 | 77.6 |
| 10 | 10.0 | 89.55 | 83.5 |
| 11 | 15.0 | 84.55 | 81.5 |
| 12 | 20.0 | 79.55 | 85.9 |

*There was also utilized in the compositions of Example 7–12 0.45 weight percent glass fibers.
¹ ASP 102 is water washed kaolin clay having an average particle size of 0.55 microns, a specific gravity of 2.58 and is sold by Minerals and Chemicals Philipp Corporation of America.
² Syloid 244 is silica having particle size of 3.3 microns, and is sold by W. R. Grace & Co., Davison Chemical Division.
³ Baymal is colloidal alumina having particles approximately 0.1 micron long and 0.005 micron in diameter and is sold by E. I. DuPont de Nemours & Co.

Table 3 below compares the fire resistant properties of cores within the scope of the invention with those not within the scope. The data in Table 3 particularly points out the effect that each of the components comprising the core has on the fire resistance properties of the core.

TABLE 3

| Ex. No. | Gypsum, weight percent | Glass fibers, weight percent | Clay (ASP 102), weight percent | Vermiculite, weight percent | Shrink resis. | Temp./F value |
|---|---|---|---|---|---|---|
| 13 | 100 | | | | 56.4 | ¹ 675 |
| 14 | 99.55 | 0.45 | | | 61.5 | ² 1,550 |
| 15 | 95.0 | | 5.0 | | 80.5 | 900 |
| 16 | 99.0 | | | 1.0 | 60.8 | ¹ 655 |
| 17 | 98.55 | 0.45 | | 1.0 | 64.1 | ¹ 1,375 |
| 18 | 94.0 | | 5.0 | 1.0 | 79.0 | 700 |
| 19 | 94.55 | 0.45 | 5.0 | | 82.4 | ¹ 1,850 |
| 20 | 93.55 | 0.45 | 5.0 | 1.0 | 77.1 | ² 1,670 |

¹ Average of 2 samples.
² Average of 3 samples.

The experimental data set forth in Table 4 below are illustrative of the improvements obtained in the fire resistant properties, including shrink resistance and temperature failure, of core compositions formulated in accordance with the invention and particularly point out the effect of varying the amounts of components utilized in making the core composition.

TABLE 4

| Ex. No. | Clay (ASP 102), weight percent | Gypsum, weight percent | Glass fibers, weight percent | Vermiculite, weight percent | Shrink resis. | Temp./F value |
|---|---|---|---|---|---|---|
| 21 | | 100.00 | | | 56.4 | [1] 675 |
| 22 | | 99.55 | 0.45 | | 61.1 | [2] 1,550 |
| 23 | 2.5 | 96.8 | 0.2 | 0.5 | 78.2 | 1,620 |
| 24 | 2.5 | 95.8 | 0.2 | 1.5 | 76.4 | 1,400 |
| 25 | 2.5 | 96.4 | 0.6 | 0.5 | 79.0 | 1,700 |
| 26 | 2.5 | 95.4 | 0.6 | 1.5 | 79.8 | 1,660 |
| 27 | 5.0 | 93.6 | 0.4 | 1.0 | 80.6 | [1] 1,675 |
| 28 | 7.0 | 90.9 | 0.6 | 1.5 | 82.3 | 1,720 |
| 29 | 7.5 | 91.8 | 0.2 | 0.5 | 83.5 | 1,600 |
| 30 | 7.5 | 90.8 | 0.2 | 1.5 | 78.2 | 1,600 |
| 31 | 7.5 | 91.4 | 0.6 | 0.5 | 82.3 | 1,650 |

[1] Average of 2 samples.
[2] Average of 3 samples.

The examples shown in Table 5 below are illustrative of the wide variety of clays that can be utilized in practicing this invention. In addition to the shrink resistance and temperature failure values of the core samples, there is also shown the extent to which the core samples sagged as they were heated. The property values given in the table are the average values of four tested samples unless otherwise indicated. When fewer than four samples were tested, the number tested is indicated by the superscript numeral appearing to the right of the temperature failure value.

*There was utilized in making the core composition of each of the samples of the samples of Examples 32 to 67 clay in the amount indicated in the table, 0.45 weight percent glass fibers, and sufficient gypsum to total 100 weight percent.

[a] A water washed kaolin clay having an average particle size of 1.2 microns, a specific gravity of 2.58 and sold by Minerals and Chemicals Philipp Corporation.
[b] A water washed kaolin clay having an average particle size of 0.55 micron, a specific gravity of 2.58 and sold by Minerals and Chemicals Philipp Corporation.
[c] A water washed delaminated kaolin clay having a particle size thickness ranging from 0.2 to 0.4 micron and ranging from 2 to 10 microns, a specific gravity of 2.58 and sold by Freeport Kaolin Company.
[d] A water washed kaolin clay having an average particle size of 2.2 microns, a specific gravity f 2.60 and sold by International Pipe & Ceramics Corporation.
[e] A calcined kaolin clay having an average particle size of 1.0 micron, a specific gravity of 2.63 and sold by Minerals and Chemicals Philipp Corporation.
[f] A calcined kaolin clay having an average particle size of 4.5 microns, a specific gravity of 2.50 and sold by Minerals and Chemicals Philipp Corporation.
[g] A calcined kaolin clay having an average particle size of 1.5 microns, a specific gravity of 2.63 and sold by Freeport Kaolin Company.
[h] Ball clay, 74 percent of particles having size less than 1 micron, a specific gravity of 2.6 and sold by United Sierra Division, Cyprus Mines Corporation under the trade name Sterling Clay.
[i] Fireclay, 54 percent particles having size less than 1 micron, a specific gravity of 2.6 and sold by United Sierra Division, Cyprus Mines Corporation under the trade name Benton Clay.
[j] Bentonite clay, the particles of which have an average dry sieve analysis of 75 to 90 percent through 200 mesh, a specific gravity of 2.7 and sold by American Colloid Company.
[k] Bentonite clay, the particles of which have an average dry sieve analysis of 90 percent finer than 20 microns, a specific gravity of 2.7 and sold by American Colloid Company.
[l] Attapulgite clay having an average particle size of 0.14 micron, a specific gravity of 2.36 and sold under the trademark of Attagel 40 by Minerals and Chemicals Philipp Corporation.
*"n.m." means not measured.

The improved performance characteristics of wallboard cores made in accordance with this invention were further demonstrated in floor and ceiling assembly tests conducted at Underwriters Laboratories, Inc. in Chicago.

In one of the tests, the ceiling of the assembly was made from wallboard within the scope of this invention. The wall-

TABLE 5

| Example number+ | Clay | Amt. of clay | Shrink resis. | Temp./F value, °F. | Sag, inches | | |
|---|---|---|---|---|---|---|---|
| | | | | | 1,200° F. | 1,400° F. | 1,600° F. |
| 32 | | | 54 | 1,343 | 0.5 | | |
| | Kaolin clays: | | | | | | |
| 33 | BWG #3[a] | 1.0 | 69.4 | [3] 1,603 | 0.4 | 0.6 | 1.5 |
| 34 | BWG #3[a] | 3.0 | 79.6 | 1,638 | 0.4 | 0.5 | 1.2 |
| 35 | BWG #3[a] | 5.0 | 82.1 | 1,530 | 0.4 | 0.5 | |
| 36 | ASP 102[b] | 1.0 | 68.8 | 1,650 | 0.4 | 0.9 | 1.5 |
| 37 | ASP 102[b] | 3.0 | 79.7 | 1,588 | 0.2 | 0.6 | |
| 38 | ASP 102[b] | 5.0 | 82.0 | 1,590 | 0.2 | 0.5 | 1.5 |
| 39 | AL-SIL-ATE N.C.[c] | 1.0 | 60.0 | [2] 1,535 | 0.5 | 0.8 | |
| 40 | do | 3.0 | 69.4 | 1,575 | 0.4 | 0.8 | |
| 41 | do | 5.0 | 82.1 | 1,465 | 0.4 | 1.0 | |
| 42 | Ione kaolin[d] | 1.0 | 70.0 | 1,640 | 0.4 | 0.7 | 1.5 |
| 43 | do | 3.0 | 79.0 | [3] 1,600 | 0.4 | 0.6 | |
| 44 | do | 5.0 | 82.1 | 1,598 | 0.4 | 0.5 | |
| | Calcined kaolin: | | | | | | |
| 45 | Satintone special[e] | 1.0 | 67.5 | [3] 1,673 | 0.4 | 1.0 | 2.0 |
| 46 | do | 3.0 | 75.0 | 1,710 | 0.4 | 0.6 | 1.2 |
| 47 | do | 5.0 | 81.5 | 1,710 | 0.4 | 0.5 | 1.1 |
| 48 | Satintone #2[f] | 1.0 | 61.5 | [1] 1,500 | 0.1 | 1.0 | |
| 49 | do | 3.0 | 74.1 | [2] 1,675 | 0.1 | 0.5 | 0.8 |
| 50 | do | 5.0 | 80.1 | [1] 1,600 | *N.m. | N.m. | N.m. |
| 51 | AL-SIL-ATE W[g] | 1.0 | 67.0 | [2] 1,635 | 0.5 | 0.5 | 0.9 |
| 52 | do | 3.0 | 76.7 | 1,715 | 0.4 | 0.7 | 1.0 |
| 53 | do | 5.0 | 84.7 | [3] 1,677 | 0.4 | 0.5 | 1.0 |
| 54 | Ball clay[h] | 1.0 | 71.6 | [2] 1,580 | 0.4 | 0.9 | |
| 55 | do | 3.0 | 75.9 | 1,590 | 0.2 | 0.6 | |
| 56 | do | 5.0 | 82.2 | [3] 1,543 | 0.4 | 0.7 | |
| 57 | Fireclay[i] | 1.0 | 54.0 | 1,453 | 0.7 | 1.2 | |
| 58 | do | 3.0 | 71.8 | 1,468 | 0.4 | 0.6 | |
| 59 | do | 5.0 | 74.0 | 1,558 | 0.2 | 0.5 | |
| | Bentonite: | | | | | | |
| 60 | Volclay #200[j] | 1.0 | 66.0 | [1] 1,656 | 0.6 | 1.0 | 1.3 |
| 61 | do | 5.0 | 75.0 | [1] 1,350 | 0.5 | | |
| 62 | Volclay #625[k] | 1.0 | 63.0 | [3] 1,580 | 0.5 | 1.0 | |
| 63 | do | 3.0 | 67.0 | 1,523 | 0.2 | 0.6 | |
| 64 | do | 5.0 | 68.0 | 1,483 | 0.4 | 0.5 | |
| 65 | Attapulgite[l] | 1.0 | 67.0 | 1,660 | 0.4 | 0.5 | 1.4 |
| 66 | do | 3.0 | 78.4 | 1,655 | 0.4 | 0.5 | 1.5 |
| 67 | do | 5.0 | 81.5 | [3] 1,677 | 0.4 | 0.5 | 1.2 | board had a nominal thickness of ⅝ inch and a core density of 43.4 lbs. per cubic foot. When tested in accordance with ASTM Designation: E 119-61, the assembly obtained a fire endurance rating of 2 hours, 0 minutes. On the other hand, the same design assembly, but one in which the ceiling consisted of commercially available fire resistant wallboard having a nominal thickness of ⅝ inch and a core density of 53.2 lbs. per cubic foot, obtained a fire endurance rating of 1 hours, 30 minutes when subjected to the same ASTM test. These comparative tests show that there was obtained a 33.3 percent increase in the the fire endurance rating when wallboard within the scope of the invention was utilized, and that this increase was obtained even though the core density of such wallboard was about 18.4 percent lower than the core density of the commercially available fire resistant wallboard.

In other tests at Underwriters Laboratories, a different design floor and ceiling assembly than utilized in the above tests was subjected to the same ASTM test mentioned above. In one test, wherein the ceiling was made from wallboard within the scope of this invention having a nominal thickness of ½ inch and a core density if 43.6 lbs. per cubic foot, the assembly obtained a fire endurance rating of 2 hours, 0 minutes. The same fire endurance rating was obtained when the ceiling of the same design assembly was made from commercially available fire resistant wallboard having a nominal thickness of ½ inch, but a core density of 47.5 lbs. per cubic foot. These comparative tests illustrate that wallboard can be made in accordance with this invention with a core having a density over 8 percent less than that of commercially available fire resistant wallboard without sacrificing fire resistant properties.

It can thus be seen from the above test reports that this invention provides wallboard cores which are capable of withstanding intensive heat to the same or greater extent than cores heretofore available and yet cores which have a significantly lower weight.

SUMMARY

The examples above magnify the significant differences and improvements in the shrink resistance and strength properties between core compositions of this invention and those heretofore known. FIG. 1 visually illustrates the differences in high temperature performance of core compositions of this invention and those heretofore known.

Storage, shipping and installation of wallboard are directly benefited by this invention. With respect to storage and shipping, more wallboard can be accommodated in a given amount of space. Workmen in handling and installing the wallboard are benefited from the reduced weight of the core.

Most important is that the invention provides a wallboard which, due to its improved fire resistant properties, will be a critical factor in deterring to a greater extent than heretofore possible the spread of fire, thereby helping to prevent property damage and injury or loss of life.

We claim:

1. Fire resistant wallboard having a core comprising the set product of:

|  | Weight Percent |
| --- | --- |
| Calcium sulfate | about 71.5 to about 99.0 |
| Glass fibers | about 0.1 to about 1.0 |
| Unexpanded vermiculite | 0 to about 7.5 |
| Small particle size inorganic material selected from the group consisting of clay, colloidal silica and colloidal alumina and mixtures thereof | about 0.5 to about 20.0 | the core having a density ranging from about 40 to about 50 pounds per cubic foot, the amounts and proportions of ingredients comprising the core being such that when the core has a thickness of 0.5 inch, the core has a shrink resistance ranging from about 60 to about 85 and a temperature failure value ranging from about 1,200° F. to about 2,000° F.

2. Fire resistant wallboard according to claim 1 wherein the small particle size inorganic material is clay.

3. Fire resistant wallboard according to claim 2 wherein the clay is kaolin clay.

4. Fire resistant wallboard according to claim 3 wherein the kaolin clay is calcined kaolin.

5. Fire resistant wallboard having a core comprising the set of product of:

|  | Weight Percent |
| --- | --- |
| Calcium sulfate | about 91.0 to about 97.0 |
| Glass fibers | about 0.2 to about 0.5 |
| Unexpanded vermiculite | about 1.0 to about 3.5 |
| Small particle size inorganic material selected from the group consisting of clay, colloidal silica and colloidal alumina and mixtures thereof | about 2.0 to about 5.0 | the core having a density of about 40 to about 50 pounds per cubic foot, the amounts and proportions of ingredients comprising the core being such that when the core has a thickness of 0.5 inch, the core has a shrink resistance ranging from about 60 to about 85 and a temperature failure value ranging from about 1,200° F. to about 2,000° F.

6. Fire resistant wallboard according to claim 5 wherein the small particle size inorganic material is clay.

7. Fire resistant wallboard according to claim 6 wherein the clay is kaolin clay.

8. Fire resistant wallboard according to claim 7 wherein the kaolin clay is calcined kaolin.

9. Fire resistant wallboard having a core comprising set gypsum, glass fibers, and small particle size inorganic material selected from the group consisting of clay, colloidal silica, colloidal alumina and mixtures thereof, the core having a density of at least about 35 pounds per cubic foot.

10. Fire resistant wallboard according to claim 9 wherein the amounts and proportions of ingredients comprising the core are such that when the core has a thickness of 0.5 inch, the core has a shrink resistance ranging from about 60 to about 85 and a temperature failure value ranging from about 1,200° F. to about 2,000° F.

11. Fire resistant wallboard having a core comprising the set product of:

|  | Weight Percent |
| --- | --- |
| Calcium sulfate | about 71.5 to about 99.0 |
| Glass fibers | about 0.1 to about 1.0 |
| Unexpanded vermiculite | 0 to about 7.5 |
| Small particle size inorganic material selected from the group consisting of clay, colloidal silica and colloidal alumina and mixtures thereof | about 0.5 to about 20.5 | the core having a density of at least about 35 pounds per cubic foot; and the amounts and proportions of ingredients comprising the core being such that when the core has a thickness of 0.5 inch, the core has a shrink resistance ranging from about 60 to about 85 and a temperature failure value ranging from about 1,200° F. to about 2,000° F.

12. Fire resistant wallboard according to claim 11 wherein the small particle size inorganic is clay.

13. Fire resistant wallboard according to claim 12 wherein the clay is kaolin clay.

14. Fire resistant wallboard according to claim 13 wherein the kaolin clay is calcined kaolin.

15. Fire resistant wallboard having a core comprising set gypsum, glass fibers, and small particle size inorganic material selected from the group consisting of clay, colloidal silica, colloidal alumina, and mixtures thereof, the core having a density ranging from about 40 to about 50 pounds per cubic foot.

16. Fire resistant wallboard according to claim 15 wherein the amounts and proportions of ingredients comprising the core are such that when the core has a thickness of 0.5 inch, the core has a shrink resistance ranging from about 60 to about 85 and a temperature failure value ranging from about 1,200° F. to about 2,000° F.

17. Fire resistant wallboard having a core comprising set gypsum, glass fibers, unexpanded vermiculite, and small particle size inorganic material selected from the group consisting of clay, colloidal silica, colloidal alumina and mixtures thereof, the core having a density ranging from about 40 to about 50 pounds per cubic foot.

18. Wallboard according to claim 17 wherein the amounts and proportions of ingredients comprising the core are such that when the core has a thickness of 0.5 inch, the core has a shrink resistance ranging from about 60 to about 85 and a temperature failure value ranging from about 1,200° F. to about 2,000° F.

19. Fire resistant wallboard having a core comprising set gypsum, glass fibers, unexpanded vermiculite and small particle size inorganic material selected from the group consisting of clay, colloidal silica, colloidal alumina and mixtures thereof, the core having a density of at least about 35 pounds per cubic foot.

20. Fire resistant wallboard according to claim 19 wherein the amounts and proportions of ingredients comprising the core are such that when the core has a thickness of 0.5 inch, the core has a shrink resistance ranging from about 60 to about 85 and a temperature failure value ranging from about 1,200° F. to about 2,000° F.

21. Fire resistant wallboard having a core comprising the set product of:

|  | Weight Percent |
|---|---|
| Calcium sulfate | about 91.0 to about 97.0 |
| Glass fibers | about 0.2 to about 0.5 |
| Unexpanded vermiculite | about 1.0 to about 3.5 |
| Small particle size inorganic material selected from the group consisting of clay, colloidal silica and colloidal alumina and mixtures thereof | about 2.0 to about 5.0 | the core having a density of at least about 35 pounds per cubic foot; and the amounts and proportions of ingredients comprising the core being such that when the core has a thickness of 0.5 inch, the core has a shrink resistance ranging from about 60 to about 85 and a temperature failure value ranging from about 1,200° F. to about 2,000° F.

22. Fire resistant wallboard according to claim 21 wherein the small particle size inorganic material is clay.

23. Fire resistant wallboard according to claim 22 wherein the clay is kaolin clay.

24. Fire resistant wallboard according to claim 23 wherein the kaolin clay is calcined kaolin.

25. Fire resistant wallboard having a core comprising the set product of:

|  | Weight Percent |
|---|---|
| Calcium sulfate | about 91.0 to about 97.0 |
| Glass fibers | about 0.2 to about 0.5 |
| Unexpanded vermiculite | about 1.0 to about 3.5 |
| Clay | about 2.0 to about 5.0 | wherein the glass fibers are drawn textile glass fibers which are short, substantially straight, resilient, flexible, individual filaments, distributed uniformly throughout the core; and wherein the vermiculite is high grade vermiculite of minus 28 U.S. Standard Mesh commercial grading; the core having a density ranging from about 40 to about 50 pounds per cubic foot, and the amounts and proportions of ingredients comprising the core being such that when the core has a thickness of 0.5 inch, the core has a shrink resistance ranging from about 60 to about 85 and a temperature failure value ranging from about 1,200° F. to about 2,000° F.

26. Fire resistant wallboard according to claim 25 wherein the clay is kaolin clay.

27. Fire resistant wallboard according to claim 26 wherein the clay is calcined kaolin.

* * * * *

UNITED STATES PATENT OFFICE
CERTIFICATE OF CORRECTION

Patent No. 3,616,173                    Dated  October 26, 1971

Inventor(s) George W. Green and Donald G. Sundberg

It is certified that error appears in the above-identified patent and that said Letters Patent are hereby corrected as shown below:

Column 2, line 51, "flexiblXility" should read --flexibility--.

Column 2, line 60, "weight" should read --weigh--.

Column 4, line 61, "X" should be deleted.

Column 4, line 67, "12,000°F" should read --2,000°F--.

Column 5, line 59, "X" should be deleted.

Column 8, line 25, "X" should be deleted.

Column 11, line 47, insert a "period" (.) after --2.47--.

Column 14, Table 3, under heading "Shrink resis.", "61.5" should read --61.1--.

Column 16, footnote c, line 2 thereof, after "and", read --diameters--.

Column 16, footnote i, line 1 thereof, after "percent", read --of--.

IN THE CLAIMS

Claim 12, line 2, after "inorganic", read --material--.

Signed and sealed this 25th day of April 1972.

(SEAL)
Attest:

EDWARD M. FLETCHER, JR.          ROBERT GOTTSCHALK
Attesting Officer                Commissioner of Patents

Dedication

3,616,173.—*George W. Green*, Portland, Oreg. and *Donald G. Sundberg*, Newark, Ohio. FIRE RESISTANT WALLBOARD. Patent dated Oct. 26, 1971. Dedication filed Nov. 23, 1973, by the assignee, *Georgia-Pacific Corporation*.

Hereby dedicates to the Public the entire remaining term of said patent.

[*Official Gazette February 19, 1974.*]